US012631057B2

(12) United States Patent
Schubert et al.

(10) Patent No.: US 12,631,057 B2
(45) Date of Patent: May 19, 2026

(54) METHOD FOR OPERATING A LOCK ARRANGEMENT FOR A MOTOR VEHICLE AND CORRESPONDING LOCK ARRANGEMENT

(71) Applicant: AUDI AG, Ingolstadt (DE)

(72) Inventors: Andre Schubert, Wellheim (DE); Bernd Ellemann, Sachsenheim (DE); Matthias Hahn, Bietigheim-Bissingen (DE)

(73) Assignee: AUDI AG, Ingolstadt (DE)

( * ) Notice: Subject to any disclaimer, the term of this patent is extended or adjusted under 35 U.S.C. 154(b) by 3 days.

(21) Appl. No.: 18/786,823

(22) Filed: Jul. 29, 2024

(65) Prior Publication Data

US 2025/0034915 A1 Jan. 30, 2025

(30) Foreign Application Priority Data

Jul. 28, 2023 (DE) ......................... 102023207268.8

(51) Int. Cl.
*E05B 81/04* (2014.01)
*E05B 81/56* (2014.01)
*E05B 81/70* (2014.01)

(52) U.S. Cl.
CPC .............. *E05B 81/56* (2013.01); *E05B 81/70* (2013.01); *E05B 81/04* (2013.01)

(58) Field of Classification Search
CPC .......... E05B 81/56; E05B 81/70; E05B 81/04; E05B 77/48; E05B 81/06; E05B 81/14; E05B 81/16; E05B 81/20; E05B 81/64; E05B 81/66; E05B 81/72; E05B 81/54
See application file for complete search history.

(56) References Cited

U.S. PATENT DOCUMENTS

| | | | | |
|---|---|---|---|---|
| 2022/0243503 | A1* | 8/2022 | Osmialowski | E05B 77/00 |
| 2022/0364397 | A1* | 11/2022 | Drost | E05B 77/54 |
| 2022/0372800 | A1* | 11/2022 | Watanabe | E05B 81/16 |
| 2023/0250679 | A1 | 8/2023 | Stekl et al. | |

FOREIGN PATENT DOCUMENTS

DE 102022201252 A1 8/2023

* cited by examiner

*Primary Examiner* — Kristina R Fulton
*Assistant Examiner* — Thomas L Neubauer
(74) *Attorney, Agent, or Firm* — Maier & Maier, PLLC

(57) ABSTRACT

A method for operating a lock arrangement for a motor vehicle, the lock arrangement has a lock which fixes a vehicle flap movably mounted on the motor vehicle in a closed position when the lock is in the locking position, holds it in the closed position when the lock is in the unlocking position or releases it for displacement into a first open position and releases it for displacement into a second open position different from the first open position when the lock is in the release position. The lock is actuated using an actuator by which an actuating element can be displaced. The lock is brought from the locking position to the unlocking position upon a first displacement of the actuating element and from the unlocking position to the release position upon a second displacement of the actuating element.

10 Claims, 1 Drawing Sheet

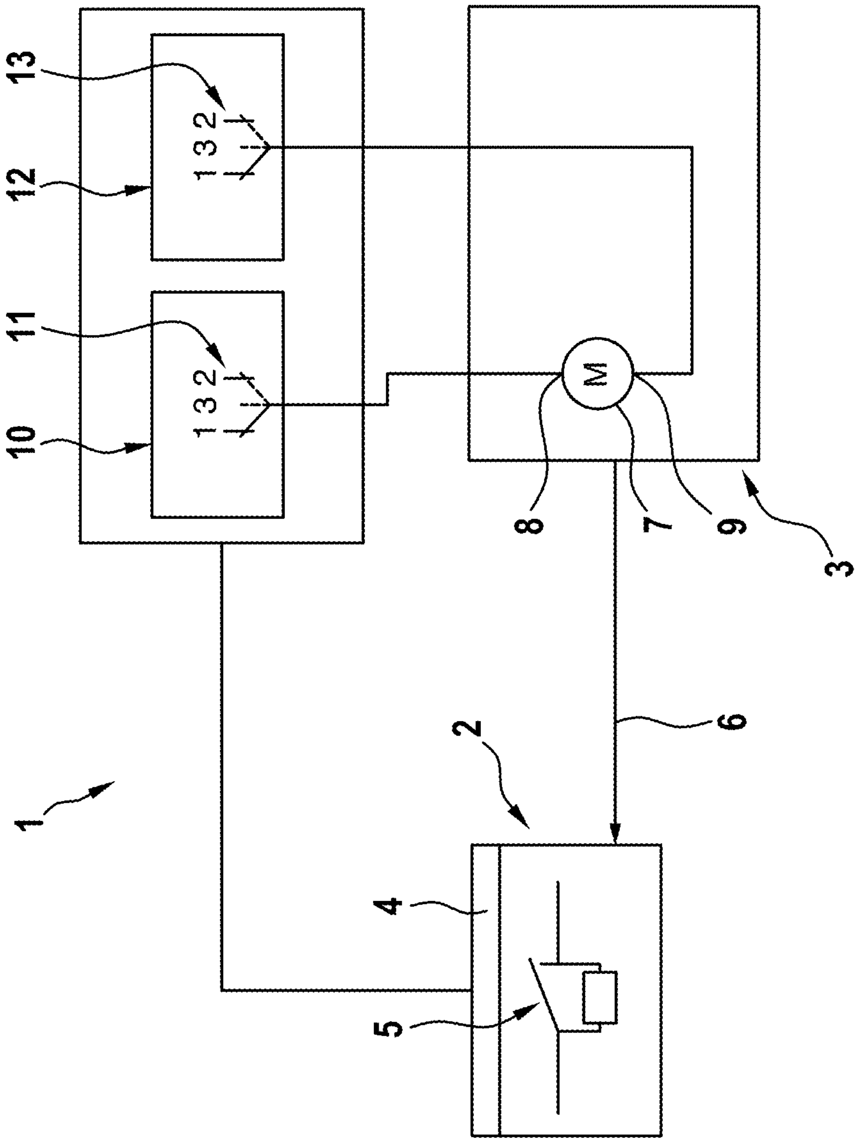
13
12
11
10
1 3 2
1 3 2
M
8
7
9
3
6
2
1
4
5

METHOD FOR OPERATING A LOCK ARRANGEMENT FOR A MOTOR VEHICLE AND CORRESPONDING LOCK ARRANGEMENT

FIELD

The invention relates to a method for operating a lock arrangement for a motor vehicle, wherein the lock arrangement has a lock which fixes a vehicle flap movably mounted on the motor vehicle in a closed position when the lock is in the locking position, holds it in the closed position when the lock is in the unlocking position or releases it for displacement into a first open position and releases it for displacement into a second open position different from the first open position when the lock is in the release position. The invention further relates to a lock arrangement for a motor vehicle.

BACKGROUND

For example, publication DE 199 23 703 B4 is known from the state of the art. This describes a hood locking/unlocking device, wherein the locking/unlocking device comprises a locking mechanism for locking the hood of a motor vehicle in its closed position, an electric drive coupled to the locking mechanism for unlocking the locking mechanism and control means for selectively releasing the electric drive depending on certain status information of the motor vehicle.

It is provided that the control means only release the electric drive if the status information indicates that the handbrake is applied and/or that the transmission of the motor vehicle is disengaged and that the control means are designed such that, after a certain period of time has elapsed after the locking mechanism has been unlocked, they activate a closing mechanism for automatically closing the hood in order to bring the hood into its closed position and then activate the electric drive in order to lock the locking mechanism again.

Furthermore, the publication DE 10 2021 119 876 A1 discloses a device for controlling a lock of a vehicle flap. This includes a control element that can be operated by a user to close an electrical circuit and thereby cause the lock of the vehicle flap to open. Furthermore, the device comprises a circuit breaker which is designed to prevent the circuit from being closed by the operating element when a vehicle flap of the vehicle is closed and to enable the circuit to be closed by the operating element when the vehicle flap of the vehicle is opened.

SUMMARY

It is the object of the invention to present a method for operating a lock arrangement for a motor vehicle which has advantages over known methods, in particular fulfills the usual safety requirements with a simpler design.

This is achieved according to the invention with a method for operating a lock arrangement for a motor vehicle. It is provided that the lock is actuated using an actuator by means of which an actuating element can be displaced, wherein the lock is brought from the locking position to the unlocking position upon a first displacement of the actuating element and from the unlocking position to the release position upon a second displacement of the actuating element, and wherein the actuator only displaces the actuating element when controlled by two separate control units.

It is pointed out that the embodiments explained in the description are not restrictive; rather, any variations of the features disclosed in the description, the claims and the figures can be implemented.

The method serves to operate the lock arrangement, which has at least the lock and the actuator. The lock arrangement is preferably part of the motor vehicle, but can of course also be present separately from it, in particular before the lock arrangement is fitted to the motor vehicle. The lock is intended and designed to keep the vehicle flap temporarily closed and temporarily release it for opening. The vehicle flap is movably mounted on the motor vehicle, preferably pivotably, i.e., rotatable about a pivot axis.

The vehicle flap is intended and designed to temporarily cover or extend over a space arranged in the body of the motor vehicle. The space is, for example, a front space of the motor vehicle, in particular an engine compartment. In this case, the vehicle flap can also be referred to as a front flap, front hood or bonnet. Alternatively, the space is a rear compartment or trunk; in this case, the vehicle flap is a boot flap or trunk flap.

In any case, the body of the motor vehicle has a recess which serves as the opening of the space. The recess is at least partially overlapped by the vehicle flap, at least temporarily. Preferably, in one position, the vehicle flap closes the recess to a substantial extent, in particular completely away from a gap present at the edge. The vehicle flap can overlap the recess or be arranged in the recess.

The vehicle flap can be arranged in different positions, namely in at least the closed position and the open position, which is also referred to here as the second open position. Between the closed position and the (second) open position there may be another open position, which is called the first open position. In the closed position, the vehicle flap closes the compartment of the motor vehicle or the recess made in the body, at least further than in the open position. At least it covers the recess to a greater extent than is the case in the (second) open position.

In the second open position, the vehicle flap exposes the recess at least in part, in particular completely or at least almost completely. For example, the vehicle flap is designed in such a way that a user of the motor vehicle can reach into the space from the outside environment through the recess when the vehicle flap is arranged in the second open position, for example in order to place there a transport item, in particular luggage. In the second open position, the user is allowed to access the area around the vehicle flap from the outside through the recess. When the vehicle flap is in the closed position, access to the space through the recess is prevented; the user cannot therefore reach into the space through the recess when the second open position is present.

The lock of the lock assembly is adjustable to three different settings, namely the locking position, the unlocking position and the release position. In the locking position, the lock holds the vehicle flap in its closed position, preventing the vehicle flap from moving from the closed position towards the second open position. In the unlocking position, the vehicle flap is unlocked, but the lock can still be designed to hold the vehicle flap in the closed position, thus preventing the vehicle flap from moving from the closed position towards the second open position.

Alternatively, the lock in the unlocking position allows the vehicle flap to be moved to the first open position. In the first open position, the vehicle flap is only partially open, thus only exposing the recess in certain areas, in particular less than in the second open position. For example, a distance between the first open position and the closed position is at most 20%, at most 10% or at most 5% of a distance between the second open position and the closed position.

For example, the lock has a locking device and a safety catch. In the locking position of the lock, the vehicle lid is held in the closed position by means of the locking device. In the unlocking position, the locking device allows the vehicle flap to be moved out of the closed position, but the movement of the vehicle flap is limited by the safety catch. For example, the safety catch is arranged in such a way that it keeps the vehicle flap in the closed position. Alternatively, it is arranged and designed in such a way that it allows the vehicle flap to be moved to the first open position. In the release position of the lock, the vehicle flap is released from both the locking device and the safety catch, allowing the vehicle flap to be moved from the closed position to the second open position. This ensures a high level of safety, as unintentional release of the vehicle flap for opening is reliably prevented.

In order to achieve a structurally simple design of the lock arrangement, the lock should be operated using only a single actuator. The actuator is an electrical actuator, for example it is designed as an electric motor or at least has one. The actuator is drive-coupled to the actuating element, which can be displaced using the actuator, for example between a first position and a second position. The actuating element is in turn coupled to the lock in terms of drive technology, so that the lock can be operated by the actuator via the actuating element. The actuating element can, for example, be in the form of a motor shaft of the actuator, a shaft coupled to the motor shaft of the actuator, a rod or the like. The actuating element can be designed in any way as long as the lock can be operated via the actuating element using the actuator.

The actuator is connected to the lock in such a way that the first time the actuating element is moved, the lock is moved from the locking position to the unlocking position. If the actuator is moved a second time following the first movement, the lock is moved from the unlocking position to the release position. This means that two separate movements of the actuator are necessary to move the lock from the locking position to the release position. The lock can therefore be described as a double-stroke lock because it requires two strokes of the actuator to completely release the vehicle flap. Preferably, in order to move the lock from the locking position to the release position, the two movements of the actuating element must be spaced apart in time. It is therefore not sufficient that the first displacement and the second displacement are part of the same continuous displacement of the actuating element.

Since the adjustment of the lock from the locking position via the unlocking position to the release position is carried out solely by means of the actuator, which is preferably the only actuator, a malfunction of the actuator or an incorrect control of the actuator could result in the lock being inadvertently set to the release position and the vehicle flap opening inadvertently. For this reason, on the one hand, the two displacements of the actuating element are necessary for this purpose and, on the other hand, to further increase safety, the actuator should be controlled by two separate control units.

Only when controlled by these two separate control units does the actuator move the control element according to the first displacement or the second displacement. If only one of the two control units controls the actuator or if one of the control units controls the actuator incorrectly, the actuator will not operate and therefore the actuating element will not be moved, so that the lock reliably maintains its current setting. Preferably, each of the control units separately meets the safety requirements according to ASIL-B. By combining the two control units to control the actuator, the lock arrangement therefore meets the safety requirements according to ASIL-D.

The control of the actuator to move the control element is initiated, for example, when a control element is operated. The control element is preferably arranged in an interior of the motor vehicle, in particular in a passenger compartment of the motor vehicle. For example, the control element is located on a dashboard of the motor vehicle or in a footwell of a driver of the motor vehicle. The control element is, for example, in the form of a switch, preferably a pushbutton switch, rocker switch, pressure switch or the like. In particular, the lock arrangement is designed such that when the control element is actuated, the lock is moved from the locking position to the release position, even if the switch is only actuated for a short time.

A further development of the invention provides that the actuating element can be displaced between a first position and a second position by means of the actuator, wherein the first displacement of the actuating element is a displacement between the first position and the second position and the second displacement of the actuating element is a further displacement between the first position and the second position. The actuating element can therefore be present at least in the first position and the second position and is moved between them by means of the actuator. The actuator can be operated at least to move the actuating element from the first position to the second position. Preferably, an operation of the actuator for displacing the actuating element from the second position to the first position is additionally provided, in particular it is absolutely necessary. In principle, such a reset could be achieved by means of a spring element that urges the actuating element towards the first position. However, this is disadvantageous for safety reasons. Therefore, the lock arrangement is designed without such a spring element, so the adjusting element does not cause any change in the setting of the lock apart from its displacement by means of the actuator.

The first displacement of the actuating element, which is necessary to move the lock from the locking position to the unlocking position, is in the form of the displacement between the first position and the second position, namely the displacement from the first position to the second position. It is therefore necessary that the adjusting element is moved completely from the first position to the second position so that the lock is moved from the locking position to the unlocking position. The same applies to the second displacement. This also takes the form of the displacement of the actuating element between the first position and the second position, i.e., the displacement from the first position to the second position.

In order to move the lock from the unlocking position to the release position, it is therefore necessary to move the adjusting element completely from the first position to the second position. Both the first displacement and the second displacement comprise a displacement of the actuating element by means of the actuator in the same direction and preferably over the same distance, namely starting from the first position to the second position of the actuating element. This ensures a high level of security for the lock arrangement.

A further development of the invention provides that a first terminal of the actuator is electrically connected to a first switch of a first of the control units and a second terminal of the actuator is electrically connected to a second switch of a second of the control units, wherein the respective terminal is electrically connected to a first electrical pole in a first setting of the respective switch and to a second electrical pole in a second setting of the respective switch and is electrically disconnected from the first electrical pole and the second electrical pole in a third setting of the respective switch. The actuator is an electrical actuator and has the first electrical terminal and the second electrical terminal, which are electrically connected to the control units. Specifically, the first terminal of the actuator is electrically connected to the first switch of the first control unit and the second terminal of the actuator is electrically connected to the second switch of the second control unit. The switches are preferably in the form of electronic switches, i.e., in particular as power semiconductor switches, for example as field-effect transistors or as bipolar transistors, or at least contain electronic switches. The switches are designed as tri-state switches, meaning they can each have three different settings.

The actuator is therefore present in a circuit which runs between the control units and contains, in addition to the actuator, at least the first switch and the second switch. Each of the switches can be in three different settings, namely the first setting, the second setting and the third setting. In the first setting and the second setting, the actuator terminal connected to the respective switch is connected to a specific electrical pole. In the third setting, the actuator terminal is electrically disconnected from the first pole and the second electrical pole via the respective switch. In the third setting of the switch, there is no electrical connection of the terminal to either the first electrical pole or the second electrical pole via the switch.

The two electrical poles correspond to different electrical potentials. For example, the first electrical pole is a positive pole and the second electrical pole is a negative pole. In any case, the poles or their electrical potentials are selected in such a way that when the actuator is connected to the two poles accordingly, the actuating element can be moved from the first position to the second position as well as from the second position to the first position. This results in the advantages explained above.

In the first setting of the first switch, the first terminal of the actuator is connected to the first electrical pole and in the second setting of the first switch, it is connected to the second electrical pole. In the first setting of the second switch, the second terminal of the actuator is electrically connected to the first electrical pole and in the second setting to the second electrical pole. If both switches are in the same setting, the two terminals of the actuator are electrically connected to the same electrical pole.

For example, the actuator is connected to the switches of the control units in such a way that when the first setting of the first switch and the second setting of the second switch are present, the actuator moves the actuating element from the direction of the first position towards the second position, and when the first switch is in the second setting and the second switch is in the first setting, the actuator moves the actuating element from the direction of the second position towards the first position. This enables the aforementioned high security of the lock arrangement.

A further development of the invention provides that when the lock is in the locking position, in a first step the actuating element is moved from the first position to the second position by means of the actuator for setting the unlocking position, in a second step the actuating element is moved from the second position to the first position by means of the actuator and in a third step the actuating element is moved from the first position to the second position by means of the actuator for setting the release position. Overall, it is necessary to control the actuator in three steps to move the lock from the locking position to the release position.

In the first step, the actuating element is moved from the first position to the second position, in the second step from the second position to the first position and in the third step again from the first position to the second position. In this case, it is provided in particular that the displacement of the actuator from the first position to the second position in the first step takes place in a first direction of movement of the actuating element, the displacement of the actuating element from the second position to the first position in the second step takes place in a second direction of movement of the actuating element opposite to the first direction of movement, and the displacement from the first position to the second position in the third step again takes place in the first direction of movement. To move the lock from the locking position to the release position, the actuator is moved in different directions and the actuator is controlled accordingly using the two separate control units. This also serves to achieve the high level of security mentioned above.

A further development of the invention provides that in order to move the actuating element from the first position to the second position, the first switch is set to the first setting and the second switch is set to the second setting and/or in order to move the actuating element from the second position to the first position, the first switch is set to the second position and the second switch is set to the first setting. Such a configuration has already been mentioned. By setting the switches of the control units differently, the opposite directions of movement of the actuator are achieved. The advantages that can be achieved through this have also already been discussed.

A further development of the invention provides that the switch of each control unit is in the third setting before setting the first setting or the second setting and/or that the switch of each control unit is set to the third setting after each displacement of the actuating element. To prevent incorrect control of the actuator by the control units, the switches should always be set to the third setting between a setting from the first setting to the second setting or vice versa. In particular, when changing the setting, each switch is set from the first setting to the second setting or vice versa to the third setting until each of the switches is in the third setting. This ensures reliable control of the actuator and enables error checking.

A further development of the invention provides that each control unit evaluates at least one state variable of the motor vehicle separately from the other control unit and determines a release value from this, wherein the setting of the switches of the control units to the first setting and/or the second setting is permitted at a first value of the release variable and prevented at a second value of the release variable. Before the control units control the actuator to move the control element, for example due to the operation of the control element, one of the release values is determined by each of the control units. For example, the first control unit determines a first release value and the second control unit determines a second release value. The release values are determined for the same release variable, in particular the control units use the same state variable or the same state variables.

The release values contain information about whether the respective control unit is allowed to control the actuator or not. If the first enable value of the first control unit corresponds to the first value, setting the first switch to the first setting and/or the second setting is permitted and otherwise prevented. If the second enable value of the second control unit corresponds to the first value, setting the second switch of the second control unit to the first setting and/or the second setting is permitted and otherwise prevented. Each of the control units therefore determines for itself whether the actuator may be controlled to move the control element, namely depending on at least one state variable of the motor vehicle. This ensures a high level of security for the lock arrangement.

A further development of the invention provides that at least one of the following variables is used as the least one state variable: driving speed of the motor vehicle, opening state of a door of the motor vehicle, opening state of the vehicle flap, connection state of a data transmission connection between the control units, comparison result between the release values of the control units and voltage applied to the actuator. The at least one state variable is supplied to each of the control units, for example via a respective data transmission connection between a device determining the state variable and the respective control unit.

It may be intended to use only one of the above-mentioned variables as a state variable. Preferably, however, several of the above-mentioned variables, in particular all of the above-mentioned variables, are included in the release value, i.e., are taken into account when determining it. If in this description the at least one state variable or the state variable is mentioned, the statements are always equivalent. The term “state variable” means the at least one state variable and conversely the term “at least one state variable” means the state variable.

The driving speed of the motor vehicle refers in particular to the instantaneous speed of the motor vehicle in its main direction of travel, in particular in the forward direction. For example, the release value is only set to the first value if the driving speed of the motor vehicle is zero, i.e., the motor vehicle is at a standstill. If the driving speed of the motor vehicle is different from zero, the release value is preferably always set to the second value. The opening state of the motor vehicle flap describes whether the door is completely closed or at least partially open. Only if the door is partially opened, the release value is set to the first value, otherwise to the second value. Particularly preferably, the opening states of several doors or all doors of the motor vehicle are taken into account when determining the release value. Setting the lock to the release position is only permitted if at least one door of the motor vehicle is at least partially open.

The opening state of the vehicle flap itself can also influence the release value. For example, this prevents the lock from being moved further into the release position since it is already in this position anyway. Furthermore, the connection status of the data transmission connection between the control units is evaluated in order to determine the release value. The control units exchange data via the data transmission connection, for example the release value determined in each case. In order to achieve a particularly high level of security, the vehicle flap cannot be opened if the data transmission connection is not available or is disrupted. To do this, setting the lock to the unlocking position is prevented by selecting the release value accordingly. If the connection state of the data transmission connection corresponds to a non-existent or faulty data transmission connection, the release value is set to the second value. However, if the connection state corresponds to a properly functioning data transmission connection, the release value is set to the first value.

Additionally or alternatively, the comparison result between the release values is taken into account. For example, the control units each determine a preliminary value of the release value and exchange it among themselves. If the release values or the preliminary values of the control units differ from one another, the vehicle flap cannot be opened and the release value is set to the second value. Only if the release values or their preliminary values match, the release value is set equal to the first value.

Furthermore, the voltage applied to the actuator can be used to determine the release value. Each of the control units measures the voltage applied to the actuator, namely at the terminal connected to the switch of the respective control unit. If a voltage other than zero is detected, it can be concluded that the switch of the other control unit is defective or is incorrectly connecting the actuator terminal to one of the poles. In this case, the release value of the control unit that detects this is set to the first setting.

If several of the sizes are used, the release value is preferably only set to the first value if all of the above conditions are met. If only one condition is not met, the release value is set to the second value in order to achieve a particularly high level of security and prevent the vehicle flap from being opened unintentionally.

A further development of the invention provides that an actuator is used as the actuator which is stable in the first position and/or the second position. This means that the actuator remains stable in the first position or the second position without power from the control units. For this purpose, it is designed to be self-locking or at least self-holding, so that a force applied to the actuator by the lock via the actuating element does not lead to a displacement of the actuating element or only does so if a certain actuating force is exceeded. If the actuator is self-locking, the actuating force will never cause the actuating element to move, at least not without causing damage. In other words, in the case of its self-locking design, the actuator does not allow any damage-free displacement of the actuating element. In the self-holding design of the actuator, a displacement of the actuating element is permitted provided that the actuating force acting on the actuating element reaches or exceeds the specified actuating force. If the actuating force is smaller than the specified actuating force, the actuator holds the actuating element stationary. In this case, it is possible to move the actuating element without causing damage even without energizing the actuator. Preferably, the actuator is stable in each of its two positions. In this case, the actuator can be said to be bistable. This also serves to achieve a particularly high level of security.

The invention further relates to a lock arrangement for a motor vehicle, in particular for carrying out the method according to one or more of the preceding claims, wherein the lock arrangement has a lock which fixes a vehicle flap movably mounted on the motor vehicle in its closed position when the lock is locked, holds it in the closed position when the lock is unlocked or releases it for displacement into a first open position and releases it for displacement into a second open position different from the first open position when the lock is released.

It is provided that the lock can be actuated using an actuator by means of which a control element can be displaced, wherein the lock is provided and designed to be moved from the locking position to the unlocking position upon a first displacement of the actuating element and from the unlocking position to the release position upon a second displacement of the actuating element, and wherein the lock arrangement is designed such that the actuator only displaces the control element when activated by two separate control units.

The advantages of such a design of the lock arrangement or such a procedure have already been discussed. Both the lock arrangement for the motor vehicle and the method for operating it can be further developed in accordance with the explanations in the context of this specification, so that reference is made to them in this respect. The vehicle flap can, but does not have to, be part of the locking arrangement.

The features and feature combinations described in the description, in particular the features and feature combinations described below in the description of the figures and/or shown in the figures may be used not only in the respective combination specified, but also in other combinations or alone, without departing from the scope of the invention. The invention should therefore also be considered to comprise embodiments that are explicitly not shown or explained in the description and/or the figures, but emerge from the explained embodiments or can be derived from them.

In the following, the invention will be explained in greater detail with reference to the exemplary embodiments depicted in the drawings, without this restricting the invention. In particular, the only

BRIEF DESCRIPTION OF THE FIGURES

FIG. 1 shows a schematic representation of a lock arrangement for a motor vehicle and a vehicle flap of the motor vehicle.

DETAILED DESCRIPTION

FIG. 1 shows a schematic representation of a lock arrangement 1, which has at least one merely indicated lock 2 and an actuator 3 for operating the lock 2. The lock 2 is associated with a vehicle flap 4 which is movably mounted on a motor vehicle and which in turn is associated with a sensor 5 for determining an opening state of the vehicle flap 4. The lock 2 can be in different settings, namely a locking position, an unlocking position and a release position.

In the locking position, the lock 2 holds the vehicle flap 4 in a closed position. When the lock 2 is set to unlock, it continues to hold the vehicle flap 4 in the closed position or releases it for movement into a first open position. In the release position of the lock 2, it releases the vehicle flap 4 to move into a second open position which is different from the first open position.

The lock 2 is operated by means of a single actuator 3, which is connected to the lock 2 via an actuating element 6. The actuator 3 is an electric actuator and preferably has an electric motor 7 which is connected to the actuator 3 via the actuating element 6. The electric motor 7 is preferably the only electric motor of the actuator 3. The actuator 3 has a first terminal 8 and a second terminal 9. The first terminal 8 is electrically connected to a first control unit 10, more precisely to a first switch 11 of the first control unit 10. Second terminal 9 is electrically connected to a second control unit 12, more precisely to a second switch 13 of the second control unit 12.

Each of switches 11 and 13 can have three different settings. In a first setting, the respective switch 11 or 12 connects the respective terminal 8 or 9 to a first pole, in a second setting to a second pole. In a third setting, however, the respective terminal 8 or 9 is electrically disconnected from both poles. The two control units 10 and 12 can be designed identically and serve identical purposes. However, they can also be intended and designed for different purposes. In addition, they can also have a different structure from one another.

The lock arrangement 1 is designed such that the lock 2 is moved from the locking position to the unlocking position upon a first displacement of the actuating element 6 and from the unlocking position to the release position upon a second displacement of the actuating element 6. Each of the two displacements comprises a displacement of the actuating element 6 by means of the actuator 3 from a first position into a second position of the actuating element 6. Between the first displacement and the second displacement, the actuating element is returned from the second position to the first position. For this purpose, switches 11 and 13 of control units 10 and 12 must be set accordingly. This ensures a high level of safety and reliably prevents unintentional opening of the vehicle flap 4.

LIST OF REFERENCE NUMERALS

1 lock arrangement
2 lock
3 actuator
4 vehicle flap
5 sensor
6 actuating element
7 electric motor
8 1. terminal
9 2. terminal
10 1. control unit
11 1. switch
12 2. control unit
13 2. Switch

The invention claimed is:

1. A method for operating a lock arrangement for a motor vehicle, wherein the lock arrangement has a lock which fixes a vehicle flap movably mounted on the motor vehicle in a closed position when the lock is in the locking position, holds it in the closed position when the lock is in the unlocking position or releases it for displacement into a first open position, and releases it for displacement into a second open position different from the first open position when the lock is in the release position, wherein the lock is actuated using an actuator that displaces an actuating element, wherein the actuating element is movable between a first position and a second position, wherein the lock is brought from the locking position to the unlocking position when the actuating element is displaced a first time from the first position to the second position, and from the unlocking position to the release position when the actuating element is displaced a second time from the first position to the second position after the actuating element returns from the second position to the first position, and wherein the actuator only displaces the actuating element when controlled by both of two separate control units.

2. The method according to claim 1, wherein a first terminal of the actuator is electrically connected to a first switch of a first of the control units and a second terminal of the actuator is electrically connected to a second switch of a second of the control units, wherein the respective terminal is electrically connected to a first electrical pole in a first setting of the respective switch and to a second electrical pole in a second setting of the respective switch and is electrically disconnected from the first electrical pole and the second electrical pole in a third setting of the respective switch.

3. The method according to claim 2, wherein for moving the actuating element from the first position to the second position, the first switch is set to the first setting and the second switch is set to the second setting and/or for moving the actuating element from the second position to the first position, the first switch is set to the second setting and the second switch is set to the first setting.

4. The method according to claim 2, wherein the switch of each control unit is in the third setting before setting the first setting or the second setting and/or in that the switch of each control unit is set to the third setting after each displacement of the actuating element.

5. The method according to claim 2, wherein each control unit evaluates at least one state variable of the motor vehicle separately from the other control unit and determines a release value from this, wherein the setting of the switches of the control units to the first setting and/or the second setting is permitted at a first value of the release value and is prevented at a second value of the release value.

6. The method according to claim 2, wherein when the lock is in the locking position, in a first step the actuating element is moved from the first position into the second position by the actuator for setting the unlocking position, in a second step, the actuating element is moved from the second position into the first position by the actuator and in a third step, the actuating element is moved from the first position to the second position by the actuator for setting the release position.

7. The method according to claim 1, wherein when the lock is in the locking position, in a first step the actuating element is moved from the first position into the second position by the actuator for setting the unlocking position, in a second step, the actuating element is moved from the second position into the first position by the actuator and in a third step, the actuating element is moved from the first position to the second position by the actuator for setting the release position.

8. The method according to claim 1, wherein at least one of the following variables is used as at least one state variable: driving speed of the motor vehicle, opening state of a door of the motor vehicle, opening state of the vehicle flap, connection state of a data transmission connection between the control units, comparison result between the release values of the control units and voltage applied to the actuator.

9. The method according to claim 1, wherein an actuator is used as the actuator which is stable in the first position and/or the second position.

10. A lock arrangement for a motor vehicle, wherein the lock arrangement has a lock which fixes a vehicle flap movably mounted on the motor vehicle in a closed position when the lock is in the locking position, holds it in the closed position when the lock is in the unlocking position or releases it for displacement into a first open position, and releases it for displacement into a second open position different from the first open position when the lock is in the release position, wherein the lock is actuated using an actuator that displaces an actuating element, wherein the actuating element is movable between a first position and a second position, wherein the lock is provided and designed to be brought from the locking position into the unlocking position upon a first displacement of the actuating element from the first position to the second position and into the release position upon a second displacement of the actuating element from the first position to the second position after the actuating element returns from the second position to the first position, and wherein the lock arrangement is designed such that the actuator only displaces the actuating element when controlled by both of two separate control units.

* * * * *